United States Patent [19]

Murai et al.

[11] Patent Number: 4,996,927
[45] Date of Patent: Mar. 5, 1991

[54] LINEAR MOTOR DRIVE CONVEYOR TRUCK

[75] Inventors: Masasumi Murai, Tokorozawa; Koichi Mizuguchi, Higashi-yamato; Jun Nishiyama, Amagasaki, all of Japan

[73] Assignee: Tsubakimoto Chain Co., Japan

[21] Appl. No.: 375,985

[22] Filed: Jul. 5, 1989

[51] Int. Cl.⁵ ............................................. B60L 13/00
[52] U.S. Cl. ..................................................... 104/291
[58] Field of Search ............... 104/290, 291, 293, 281, 104/282; 310/12, 13, 90.5; 198/860.1, 860.3

[56] References Cited

U.S. PATENT DOCUMENTS

| | | | |
|---|---|---|---|
| 1,812,112 | 11/1926 | Morgan | 198/860.2 |
| 3,563,203 | 6/1969 | Stiltner | 198/860.2 |
| 4,817,533 | 4/1989 | Azukizawa et al. | 104/290 |

Primary Examiner—Joseph F. Peters, Jr.
Assistant Examiner—Virna Lissi Mojica
Attorney, Agent, or Firm—Ferrill and Logan

[57] ABSTRACT

There is disclosed a truck for use with a linear motor drive conveyor for conveying articles such as automotive bodies through a paint station. Shield means are provided carried by the reaction plate which in turn is carried by the truck. The shield means includes a central flat plate and downturned side edges which overlie and protect the gap between the reaction plate and the primary members of the linear motor from paint or other foreign particles.

3 Claims, 3 Drawing Sheets

LINEAR MOTOR DRIVE CONVEYOR TRUCK

FIELD OF THE INVENTION

This invention relates to a truck for use in a linear motor drive conveyor which is suitable for conveying large articles such as automotive bodies.

BACKGROUND OF THE INVENTION

Heretofore, in a linear motor drive conveyor, there has been provided a truck having a reaction plate secured on the lower surface thereof, said reaction plate opposing fixed primary members of a linear induction motor. Such a conveyor is described in copending application Ser. No. 202,951, filed June 6, 1988, assigned to the assignee of the present application, the disclosure of which is incorporated herein by reference. Although the linear motor drive conveyor is useful and suitable for high speed conveyance, such a conveyor has a drawback that in case it is used in the painting process of automotive bodies, it is essential to clean it periodically because paints tend to adhere on the top surfaces of the primary members and flow into clearances between the reaction plates and the primary members.

SUMMARY OF THE INVENTION

Accordingly, it is an object of the present invention to provide a truck for use in a linear motor drive conveyor having means for preventing any foreign matter from entering into the clearance between a reaction plate fixed to the truck and the primary members of the linear motor drive.

The present invention provides a truck for use in a linear motor drive conveyor. Said truck includes a stand for mounting articles. Further, support wheels are mounted to the stand on the lower surface thereof to run on guide rails provided on a fixed member such as a factory floor, and a reaction plate is carried by the stand opposing primary members of a linear induction motor carried by the fixed member. Said reaction plate includes a pendent shielding plate extending beyond the top surface of the primary members from the side edges of the reaction plate.

In such a truck, the pendent shielding plate surrounds not only the top surface of the primary members but also the clearance between the reaction plate and the primary members at both sides.

Thus, it is possible to prevent any foreign matter from adhering onto the top surface of the primary members.

BRIEF DESCRIPTION OF THE DRAWINGS

The drawings show preferred embodiments of the present invention in which.

PREFERRED EMBODIMENTS OF THE INVENTION

Figure 1:
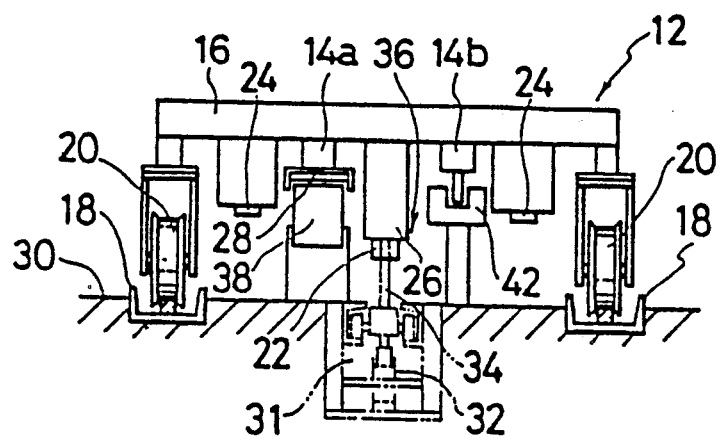
FIG. 1 is a plan view of a truck for use with a linear motor drive conveyor.

With reference to accompanying drawings, preferred embodiments will be explained hereinbelow.

The first embodiment of the present invention is shown in FIGS. 1 to 5. A truck 12 comprises a pair of longitudinally extending frames 14a, 14b equally spaced from the center line thereof and extending beyond a front and a rear end of articles (not shown) such as automotive bodies to be carried by the truck. Front and rear stands 16, 16 extending transversely to the longitudinal frames 14a, 14b are provided to mount the articles to be carried. Each of stands 16, 16 includes support wheels 20, 20 mounted on opposite ends of the stands at the lower surfaces thereof and running on tracks 21 within concave guide rails 18, 18 which are laid on a fixed surface 30, such as a factory floor. Guide rollers 22, 22 pivotably mounted to the stands at the center of each stand on the lower surfaces, and rotatable wheels 24, 24 mounted to the stands between the running wheels 20, 20 and the frames 14a, 14b are provided to engage stationary guide means (not shown) to guide turning of the truck. The support wheels 20, 20, the guide roller 22 and the rotatable wheels 24, 24 are substantially aligned in the transverse direction to ensure that the truck is capable of turning in a horizontal plane with a minimum radius of curvature. However, since such an aspect is not the subject matter of this invention, detailed explanation of the guide means which would include conventional rails engaging the roller 22 and wheels 24, 24 is not necessary.

Preferably, means are provided to stop the drive by the linear induction motor and drive the truck by a mechanical drive, such as a chain drive, during portions of its movement. To this end, pressure plates 26, 26 are fixed between the longitudinal frame members 14a, 14b at the longitudinal axis of the truck. A longitudinally extending pit 31 is provided in the fixed surface or factory floor 30 where a chain drive is desired, within which is a driving chain 32 carrying a pusher member 34. As hereinafter described, as the truck reaches the chain drive area, the linear drive motor is stopped and the pusher member of the driving chain engages the fixed member 26 on the truck as at 36. Thus, the truck 12 may be driven by means of the chain 32 at desired locations.

On the lower surface of the longitudinal frame member 14a a reaction plate 28 is provided forming a secondary member of a linear induction motor along the overall length thereof. Secured to the lower surface of the reaction plate 28 is a non-magnetic plate 29 made of aluminum, copper and the like which has a good electric conductivity.

Primary members 38 of linear induction motor are attached on the fixed surface 30 so as to oppose the reaction plate 28. It is to be noted that the primary members 38 are provided in the linear-motor-driving sections only, and are not provided in the chain-driving sections.

Figure 2:
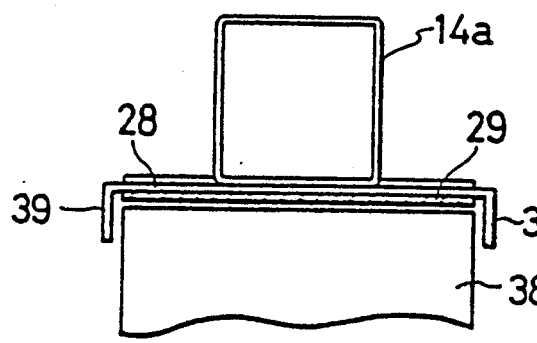
FIG. 2 is an enlarged plan view showing the relationship between a reaction plate and a primary member of the linear motor.
Figure 3:
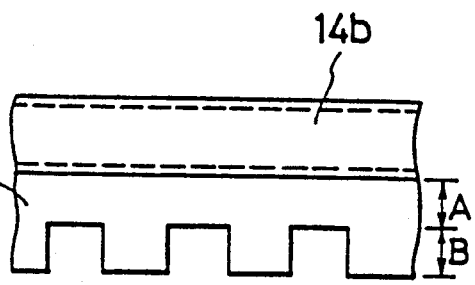
FIG. 3 is an enlarged side view of a saw-shaped slit plate used an an aid in controlling the motor speed.
Figure 4:
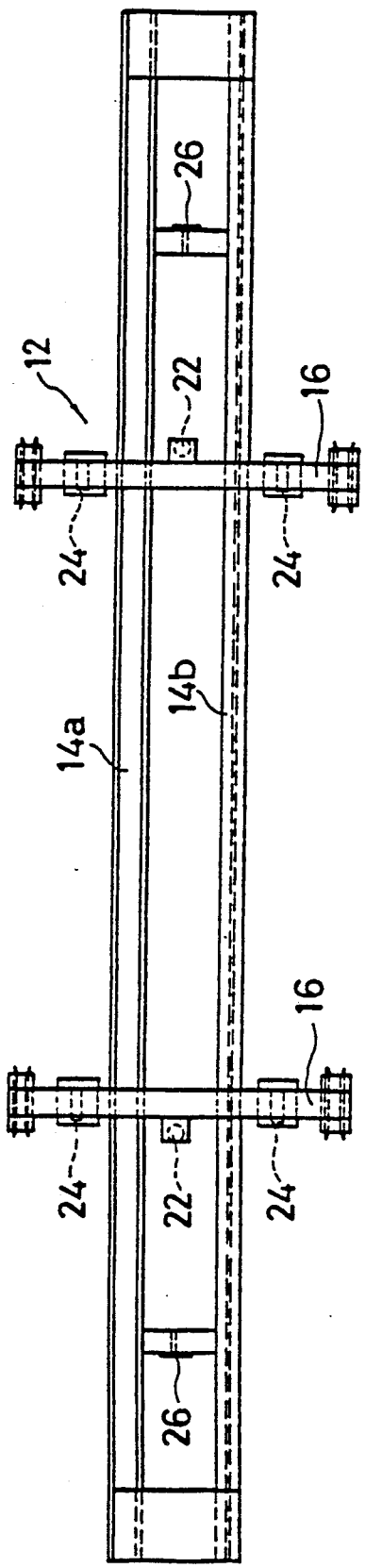
FIG. 4 is a top view of the truck shown in FIG. 1.
Figure 5:
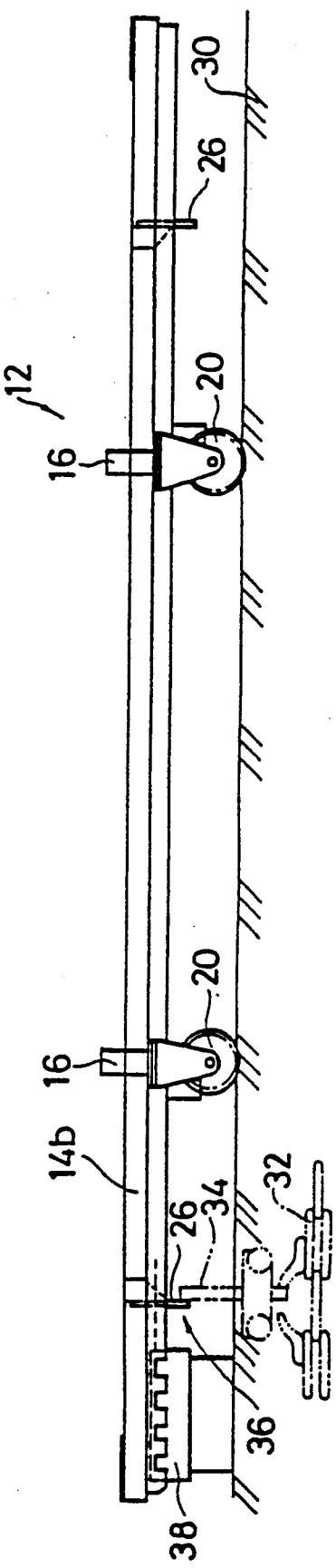
FIG. 5 is a side view of the truck shown in FIG. 1.

As shown in FIG. 2, the reaction plate 28 includes a pendent shielding plate 39 extending beyond the top surface of a primary member 38 from both side edges of the reaction plate 28 so as to surround the clearance between the reaction plate 28 and the primary member 38 at both sides. Thus, the pendent shielding plate 39 protects the exposed top surface of the primary member 38 under the extending frame 14a extending beyond the front and rear ends of the articles when the truck 12 is conveyed.

On the lower surface of the other longitudinal frame member 14b is provided an intercepting plate 40 having a slit-less portion A and a saw-shaped slit portion B formed beneath the slit-less portion A. On the fixed surface 30 is provided a photoelectric element 42 which senses the arrival of the truck 12 responding to the slit-less portion A and which also senses the frequency of interruption of the light through the saw-shaped portion B, thereby controlling the speed of the truck 12 in any conventional manner.

Accordingly, whether the truck 12 is moving or not, the top surface of the primary members 38 may be protected by the reaction plate 28. Further, foreign matter may be prevented from entering into the clearance between the primary members 38 and the reaction plate 28 at both sides. This arrangement is particularly useful for preventing mist-like paint from entering into the clearance between the primary members 38 and the reaction plates 28 during the painting process of automotive bodies. Owing to the reaction plate 28 extending the full length of the longitudinal frame member 14a, which in turn extends beyond the front and rear ends of the articles to be painted, paint emitted toward automotive bodies will not adhere onto the primary members 38 or enter into the clearance.

Figure 6:
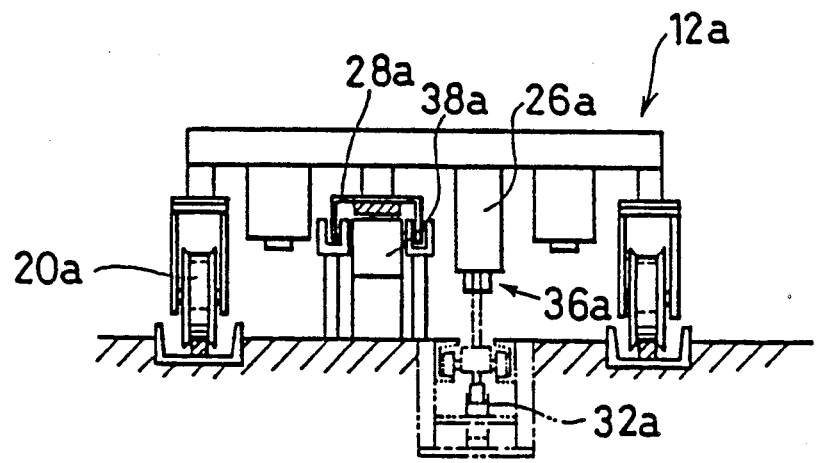
FIG. 6 is a plan view of a further embodiment of the truck.
Figure 7:
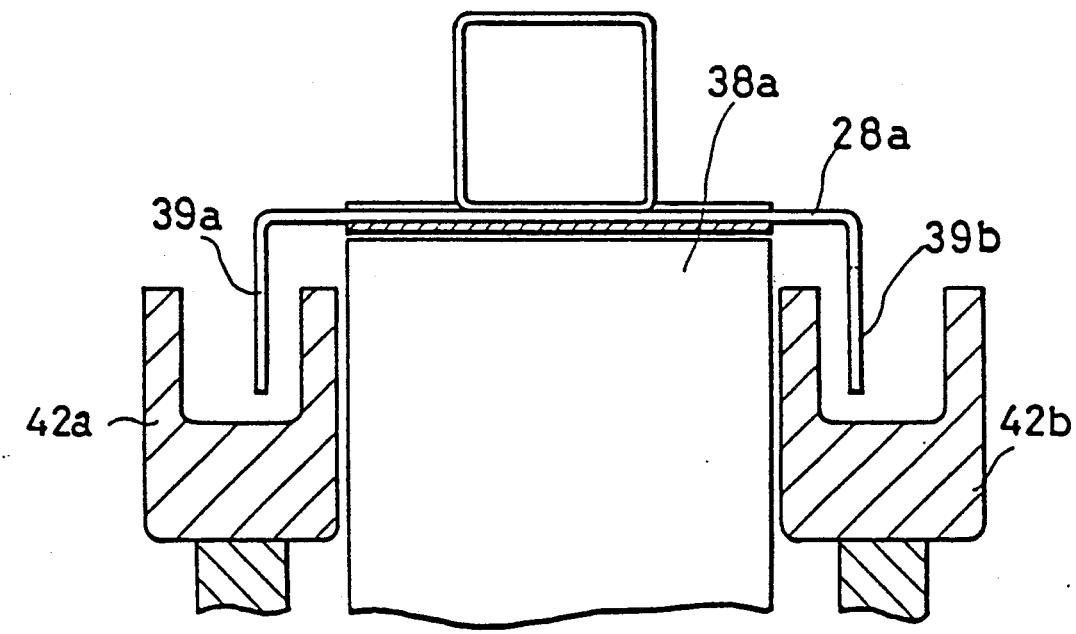
FIG. 7 is an enlarged plan view showing the relationship between a reaction plate shown in FIG. 6 and a primary member.

FIGS. 6 and 7 show a truck according to the second embodiment of the present invention. In this embodiment, the truck 12a is constructed such that a driving chain 32a and the engagement 36a between the truck and drive chain are moved sidewardly from the center line. As a result, a larger space is provided between the pressure plate 26a and one of the support wheels 20a, 20a. The reaction plate 28a and primary members 38a are disposed in this space. The reaction plate 28a extends beyond the top surface of the primary members 38a in the transverse direction and includes pendent shielding plates 39a, 39b at both sides. One of the pendent shielding plates is a slit-less intercepting plate 39a. The other of the pendent shielding plates is a saw-shaped slit plate 39b formed with a number of slits with the same interval. 42a, 42b show photoelectric elements sandwiching the pendent shielding plates.

By virtue of the arrangement of the truck 12a as above mentioned, the face-to-face area between the reaction plate and the primary member may be substantially increased, thereby attaining substantially larger driving force if the size of the truck is the same as that of the first embodiment. Moreover, the truck may be constructed compactly because the width of the primary members 38a and the slit-less plate and the saw-shaped slit plate may be formed integrally with the pendent shielding plate.

While particular embodiments of the invention have been illustrated and described herein, it is not intended to limit the invention to such a disclosure, and changes and modifications may be incorporated and embodied therein within the scope of the following claims.

What is claimed is:

1. A truck for use in a linear motor drive conveyor to run on guide rails provided in a fixed surface, said truck comprising a stand for mounting articles, support wheels mounted to the stand on the lower surface thereof so as to run on said guide rails, and a reaction plate extending longitudinally of said stand, said reaction plate opposing primary members of a linear motor provided on the fixed surface, said reaction plate including a pendent shielding plate extending beyond the top surface of the primary members from the side edges of the reaction plate, said pendent shielding plate protecting the linear motor and moving with the truck.

2. Apparatus in accordance with claim 1 wherein said reaction plate extends longitudinally of said truck for the full length thereof and said pendant shielding plate extends the full length of said reaction plate.

3. Apparatus in accordance with claim 2 wherein said pendent shielding plate has side portions extending downwardly the full length of said plate terminating below said reaction plate.

* * * * *

UNITED STATES PATENT AND TRADEMARK OFFICE
CERTIFICATE OF CORRECTION

PATENT NO. : 4,996,927

DATED : March 5, 1991

INVENTOR(S) : Masasumi Murai, Koichi Mizuguchi, and Jun Nishiyama

It is certified that error appears in the above-identified patent and that said Letters Patent is hereby corrected as shown below:

Col. 4, line 10, after "the" (second occurence) insert --reaction plate 28a may be elongated relative to the width of the--

Signed and Sealed this

Twenty-third Day of June, 1992

Attest:

DOUGLAS B. COMER

Attesting Officer

Acting Commissioner of Patents and Trademarks